United States Patent
Takahashi (10) Patent No.: US 7,357,418 B2
(45) Date of Patent: Apr. 15, 2008

(54) STEERING SHAFT SUPPORT STRUCTURE FOR VEHICLE FOR UNEVEN GROUND RUNNING

(75) Inventor: Shinji Takahashi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 240 days.

(21) Appl. No.: 10/733,410

(22) Filed: Dec. 12, 2003

(65) Prior Publication Data
US 2004/0178619 A1 Sep. 16, 2004

(30) Foreign Application Priority Data
Dec. 27, 2002 (JP) .............................. 2002-381297

(51) Int. Cl.
*B62K 5/00* (2006.01)
*B62K 11/04* (2006.01)

(52) U.S. Cl. ...................... 280/779; 280/781; 280/835; 180/311

(58) Field of Classification Search ................ 180/311, 180/312; 280/781, 779, 785, 834, 835; 403/234, 403/164, 165, 370, 366, 365
See application file for complete search history.

(56) References Cited

U.S. PATENT DOCUMENTS

| | | | | |
|---|---|---|---|---|
| 1,654,675 A | * | 1/1928 | Bourgon ....................... 280/779 |
| 4,535,869 A | * | 8/1985 | Tsutsumikoshi et al. ..... 180/311 |
| 4,667,765 A | * | 5/1987 | Tomoyuki .................... 180/311 |
| 4,735,275 A | * | 4/1988 | Tsukahara et al. ........... 180/215 |
| 4,753,448 A | * | 6/1988 | Nagashima .................. 280/264 |
| 5,699,872 A | * | 12/1997 | Miyakawa et al. .......... 180/291 |
| 5,715,903 A | * | 2/1998 | Summers et al. ............ 180/219 |
| 5,782,136 A | * | 7/1998 | Witkovsky et al. ........... 74/492 |
| 6,035,741 A | * | 3/2000 | Krizman, Jr. ............... 74/551.8 |
| 6,085,857 A | * | 7/2000 | Horiuchi ...................... 180/292 |
| 6,412,856 B1 | * | 7/2002 | Kajikawa et al. ....... 296/203.01 |
| 6,454,039 B1 | * | 9/2002 | Matsuura ..................... 180/336 |
| 6,497,300 B2 | * | 12/2002 | Mori et al. ................... 180/219 |
| 6,523,634 B1 | * | 2/2003 | Gagnon et al. .............. 180/291 |
| 2003/0001377 A1 | * | 1/2003 | Ishii et al. ................... 280/785 |
| 2003/0201637 A1 | * | 10/2003 | Bergman ..................... 280/834 |

FOREIGN PATENT DOCUMENTS

| | | | |
|---|---|---|---|
| FR | 2 480 221 | * | 4/1980 |
| JP | 07-267164 | * | 10/1995 |
| JP | 09-207855 | * | 8/1997 |

* cited by examiner

*Primary Examiner*—Ruth Ilan
*Assistant Examiner*—George D. Spisich
(74) *Attorney, Agent, or Firm*—Birch, Stewart, Kolasch & Birch, LLP (57) ABSTRACT

In a vehicle for uneven ground operation front wheels can be steered with a handle via a steering shaft mounted rotatably on the body frame with an upper cross beam being placed in spanning relationship between left and right front upper pipes composing the body frame and said steering shaft is supported by the upper cross beam. The left and right pipes can be coupled firmly to each other with the upper cross beam for enhancing the rigidity of the body frame. In addition, the number of components can be reduced as compared to providing a distinct steering shaft support member so that a reduction in the weight of the vehicle is achieved. If the upper cross beam is bend molded, the rigidity of the upper cross beam can be enhanced so that the rigidity of the body frame is further enhanced, while a weight increase is suppressed.

19 Claims, 7 Drawing Sheets

STEERING SHAFT SUPPORT STRUCTURE FOR VEHICLE FOR UNEVEN GROUND RUNNING

CROSS-REFERENCE TO RELATED APPLICATIONS

The present application claims priority under 35 USC 119 to Japanese Patent Application No. 2002-381297 filed on Dec. 27, 2002 the entire contents thereof is hereby incorporated by reference.

BACKGROUND OF THE INVENTION

1. Field of the Invention

The present invention relates to a steering shaft support structure for steering the front wheels of a vehicle for uneven ground operation.

2. Description of Background Art

A steering shaft support structure is known that is provided with a steering bracket. See for example, Japanese Examined Patent Publication No. HEI 6-92237 (Page 3, FIG. 1).

FIG. 1 of Japanese Examined Patent Publication No. HEI 6-92237 will be described with reference to FIG. 6 of the drawings attached to the present specification. It is to be noted that reference numerals in FIG. 6 have been reassigned and are not the same reference numerals as set forth in Japanese Examined Patent Publication No. HEI 6-92237.

Figure 6:
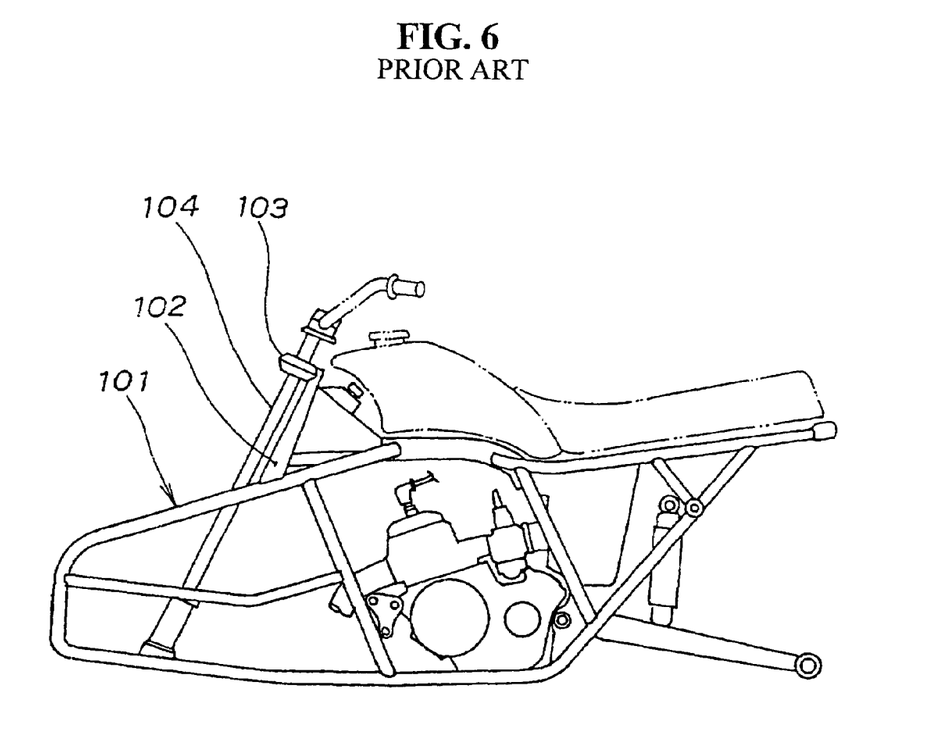
FIG. 6 is a side view of a conventional embodiment showing a conventional steering shaft support structure.

FIG. 6 is a side view of a conventional embodiment showing a conventional steering shaft support structure. A saddle-type vehicle is illustrated wherein a steering bracket 102 is mounted on the front portion of the body frame 101, the front face of the steering bracket 102 is provided with a shaft strut portion 103, and the steering shaft 104 is supported at the shaft strut portion 103.

Figure 7:
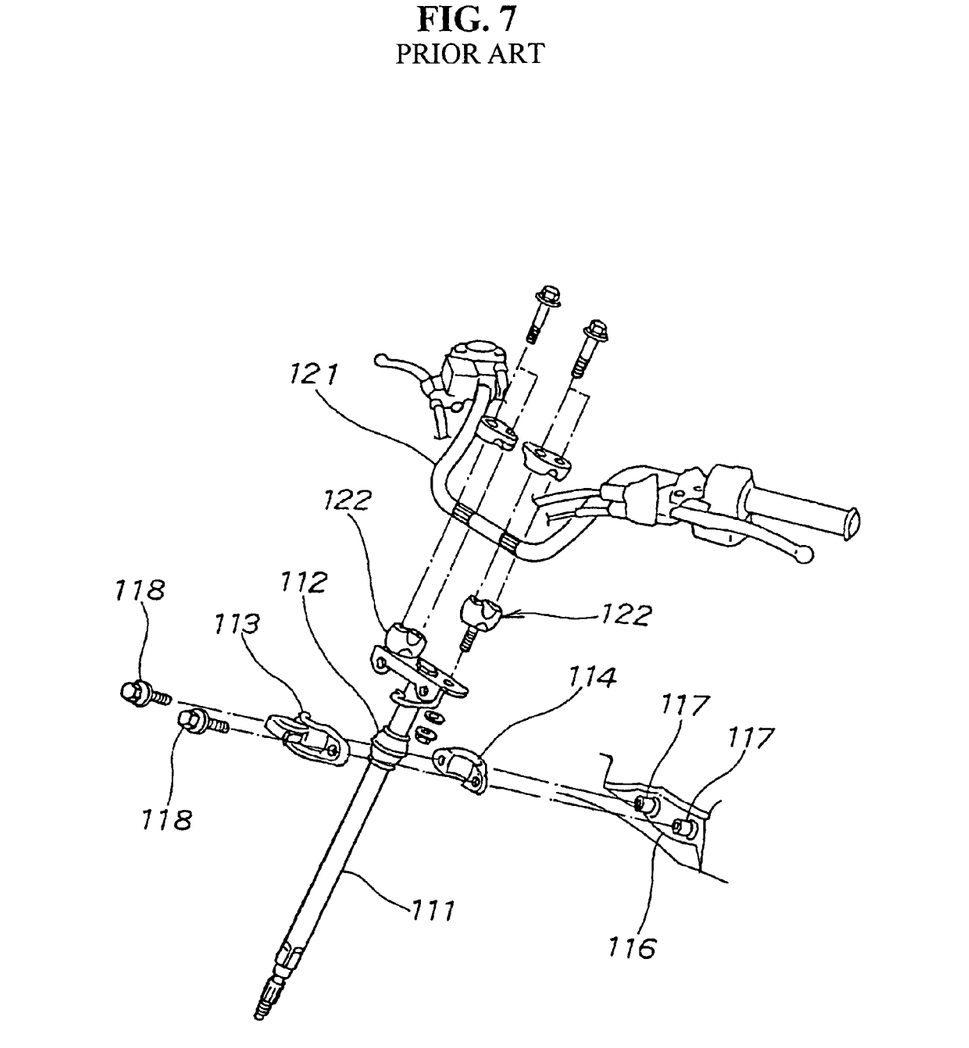
FIG. 7 is a perspective view of a conventional embodiment showing a conventional steering shaft support structure.

A steering support structure is also known as shown in FIG. 7.

FIG. 7 is a side view of a conventional embodiment showing a conventional steering shaft support structure, wherein the mounting of front and rear holders 113 and 114 on a body frame 116 is effected by inserting a steering shaft 111 through a bushing 112, sandwiching the bushing 112 between the front and rear holders 113 and 114, and screwing bolts 118 and 118 into nuts 117 and 117 provided on the body frame 116. Here, a bar handle 121 is mounted on the upper portion of the steering shaft 111 via hand holders 122 and 122.

The saddle-type vehicle shown in FIG. 6 aims at an uneven ground operation. Since the vehicle operates on uneven ground, such as a craggy place or a sandy place, it is required to have mobility. Accordingly, a body light in weight and high is rigidity is desired.

If the steering bracket 102 is replaced with a part of the body frame 101, the number of components is reduced so that a reduction in weight is achieved. If the rigidity of the body can be enhanced by, e.g., altering the configuration of a part of the body frame 101 without adding an extra component to the body frame 101, the weight increase can be suppressed.

Since the steering shaft 111 is supported also at each of the rear holder 114 and body frame 116 of the body in FIG. 7, the integration of these components should be considered.

SUMMARY AND OBJECTS OF THE INVENTION

It is therefore an object of the present invention to improve a steering shaft support structure particularly for uneven ground operation and thereby reduce the weight of the vehicle by reducing the number of the components thereof, while enhancing the rigidity of the body.

To attain the this object, a vehicle for uneven ground operation is provided in which front wheels and rear wheels are suspended from a body frame via a suspension and the front wheels can be steered with a handle via a steering shaft mounted rotatably on the body frame, a cross beam is placed in spanning relation between left and right pipes composing the body frame. The steering shaft is supported by the cross beam.

Since the cross beam is placed in spanning relation between the left and right pipes of the body frame to support the steering shaft, the left and right pipes can be coupled firmly to each other with the cross beam so that the rigidity of the body frame is enhanced. In addition, the number of components can be reduced compared with the case where a steering shaft support member is provided distinctly so that a reduction in the weight of the body is achievable.

By bend molding the cross beam to mount the steering shaft on the cross beam, the rigidity of the cross beam can be enhanced and the rigidity of the body frame can further be enhanced, while the weight increase is suppressed.

In addition, the cross beam includes a tank support portion for supporting a fuel tank.

Since the cross beam also includes the fuel tank supporting portion, an extra fuel tank support member is no longer necessary. This achieves further reductions in the number of the components and in the weight of the body.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Referring to the accompanying drawings, the embodiments of the present invention will be described herein below. It is assumed that the drawings are viewed from a direction facing the reference numerals.

Figure 1:
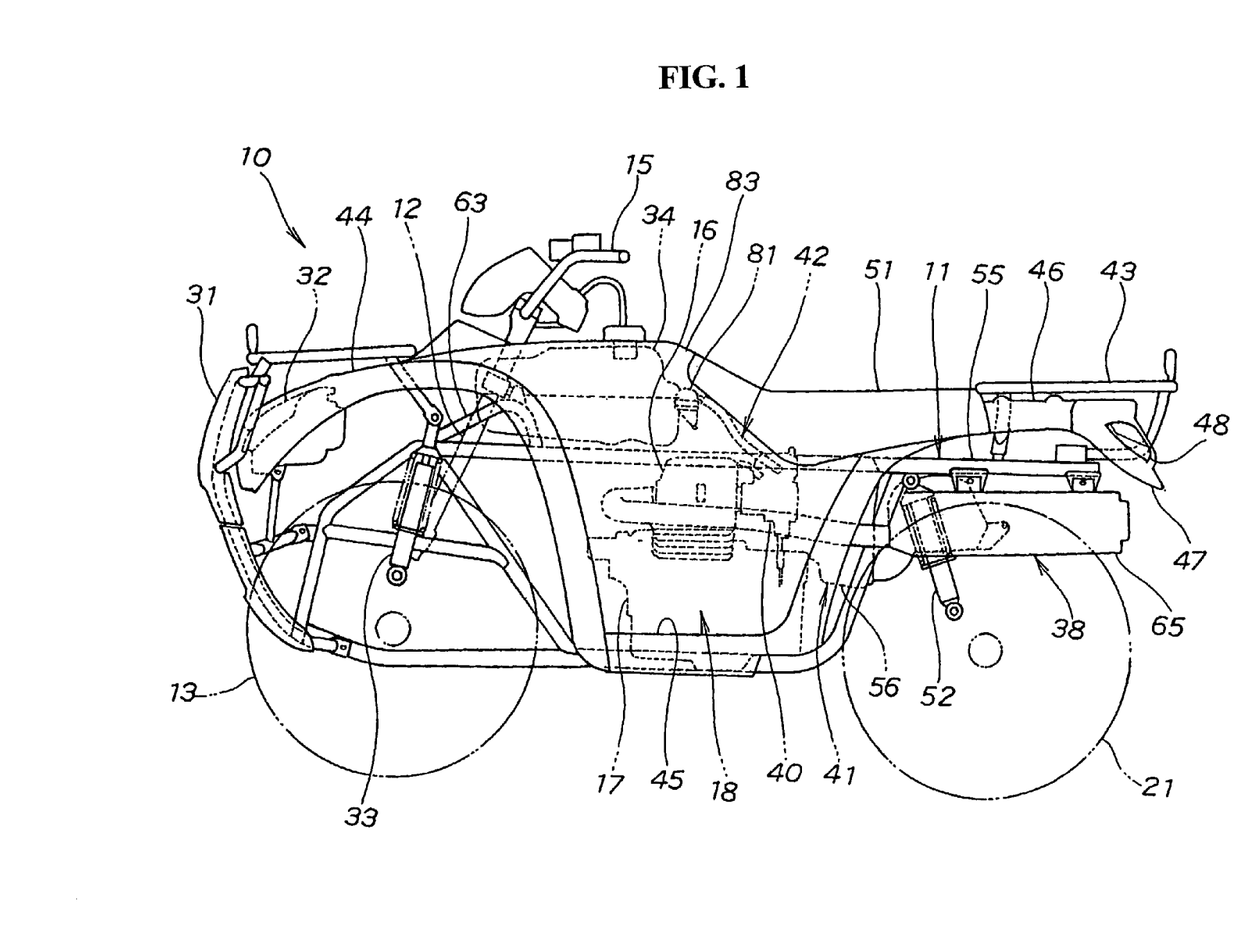
FIG. 1 is a side view of a vehicle using a steering shaft support structure according to the present invention.

FIG. 1 is a side view of a vehicle using a steering shaft support structure according to the present invention. A vehicle 10 is a vehicle for uneven ground operation in which a steering shaft 12 is mounted on the front portion of a body frame 11, the lower end portion of the steering shaft 12 is coupled to left and right front wheels 13 and 14 (only the anterior front wheel 13 is shown). A handle 15 is mounted on the upper end portion of the steering shaft 12 with a power unit 18 composed of an engine 16 and a transmission 17 being mounted on the middle portion of the body frame 11. Rear wheels 21 and 22 (only the anterior rear wheel 21 is shown) are driven together with the front wheels 13 and 14 by the power unit 18 and are disposed in the rear portion of the body frame 11.

A front guard 31 is provided for protecting the front face of the body with head lamps 32 and 32 (only the anterior reference numeral 32 is shown). Shock absorbers 33 and 33 (only one of the reference numerals is shown) are provided for the front wheels 13 and 14. A fuel tank 34 is mounted on the body frame 11 with an exhaust unit 38 connected to the front portion of the engine 16 and bent and extending rearwardly. A carburetor 40 is connected to the rear portion of the engine 16 with an air cleaner unit 41 coupled to the rear portion of the carburetor 40. An air vent unit 42 is provided for exerting an atmospheric pressure on a level of a fuel in a float chamber provided in the carburetor 40. A rear carrier 43 is provided for carrying luggage with front fenders 44 and 44 (only the anterior reference numeral 44 is shown) covering the front wheels 13 and 14 from above and from behind. A step 45 and 45 (only the anterior reference numeral 45 is shown) is provided on which a driver may rest his or her legs with rear fenders 46 and 46 (only the anterior reference numeral 46 is shown) covering the rear wheels 21 and 22 from the front and from above. Mud guards 47 and 47 (only the anterior reference numeral 47 is shown) are attached to the rear fenders 46 and 46. Tail lamps 48 and 48 (only the anterior reference numeral 48 is shown) are attached to the mud guards 47 and 47. A seat 51 and shock absorbers 52 and 52 (only the anterior reference numeral 52 is shown) are provided for the rear wheels 21 and 22.

Figure 2:
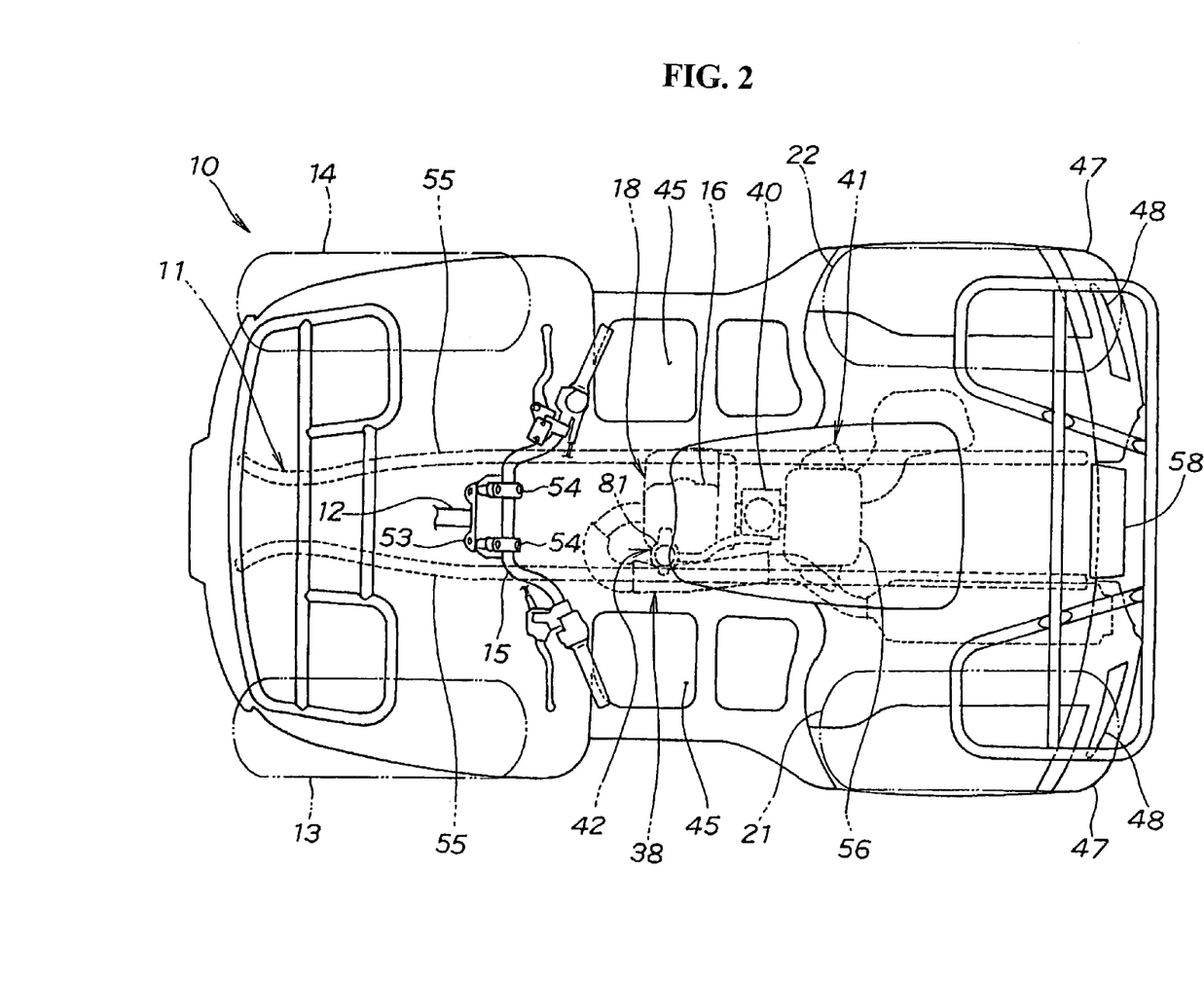
FIG. 2 is a plan view of the vehicle according to the present invention.

FIG. 2 is a plan view of the vehicle according to the present invention, which shows that left and right main frames 55 and 55 composing a part of the body frame 11 are disposed at the center portion of the body to extend in a front-to-rear direction. The power unit 18, the carburetor 40 and a main air cleaner 56 composing the air cleaner unit 41 are disposed between the main frames 55 and 55. The exhaust unit 38 is bent into a U-shaped configuration from the engine 16 and extends rearwardly.

A handle support member 53 is mounted on the upper portion of the steering shaft 12 and that the handle 15 is mounted on the handle support member 53 via handle picking members 54 and 54.

Mud guards 47 and 47 are disposed on the left and right portions of the body with a license plate 58 interposed therebetween.

Figure 3:
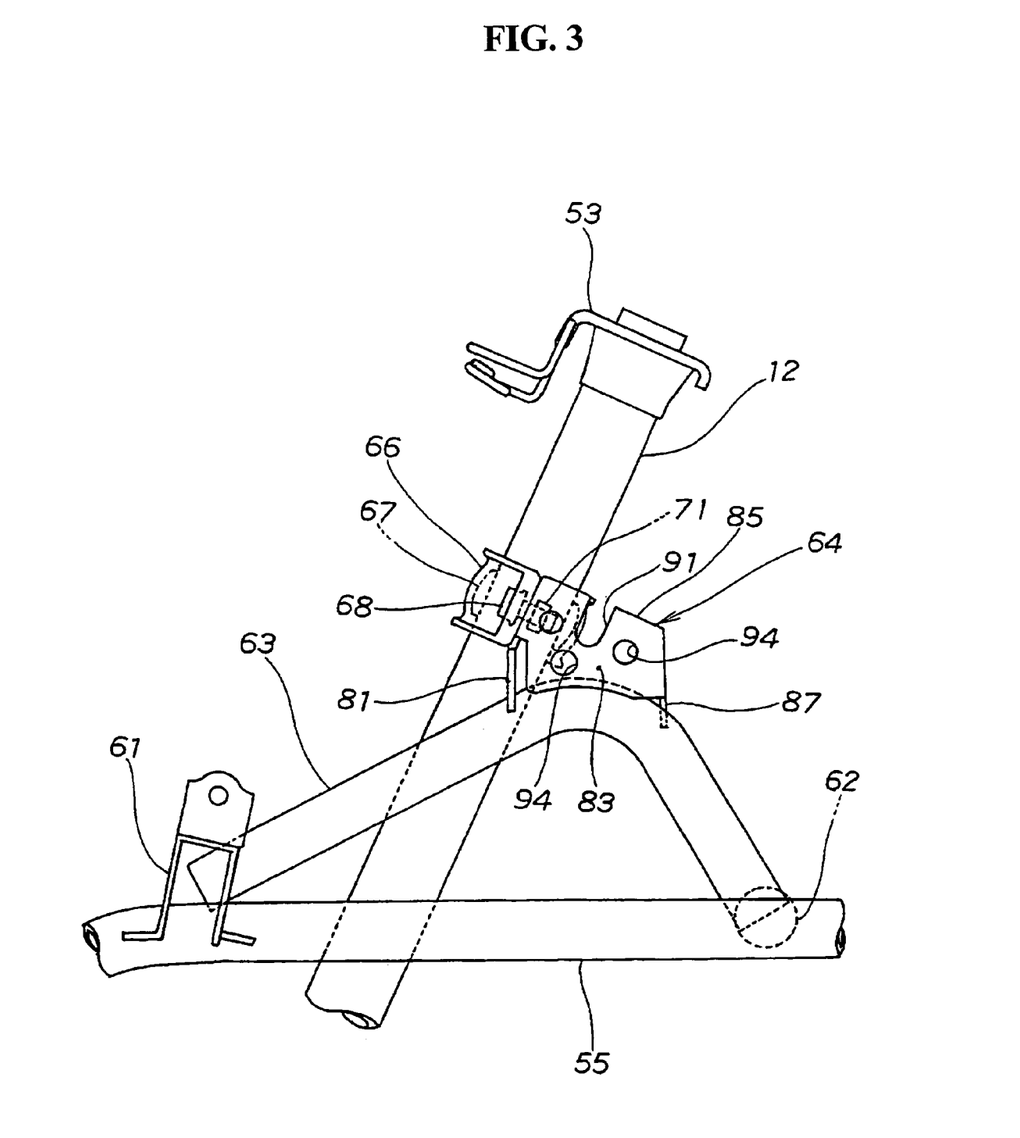
FIG. 3 is a principal-portion side view showing the steering shaft support structure according to the present invention.

FIG. 3 is a principal-portion side view showing the steering shaft support structure according to the present invention wherein each of a first front cross member 61 and a second front cross member 62, provided behind the first front cross member 61, is placed in spanning relation between the left and right main frames 55 and 55 (only the anterior reference number 55 is shown). An upper cross beam 64 is provided as a cross beam that is placed in spanning relation between a pair of left and right L-shaped front upper pipes 63 and 63 (only the anterior reference numeral 63 is shown) and being formed with the first and second front cross members 61 and 62. The steering shaft 12 is supported in a sandwiched relationship between the upper cross beam 64 and the front holder 66.

A bushing 67 is provided through which the steering shaft 12 is inserted. The bushing 67 is a member provided between the steering shaft 12 and each of the upper cross beam 64 and the front holder 66 to rotatably mount the steering shaft 12 on the upper cross beam 64 and the front holder 66. Bolts 68 and 68 (only the anterior reference numeral 68 is shown) are provided together with nuts 71 and 71 (only the anterior reference numeral 71 is shown). The front holder 66 is mounted on the upper cross beam 64 by screwing the bolts 68 and 68 into these nuts 71 and 71.

Figure 4:
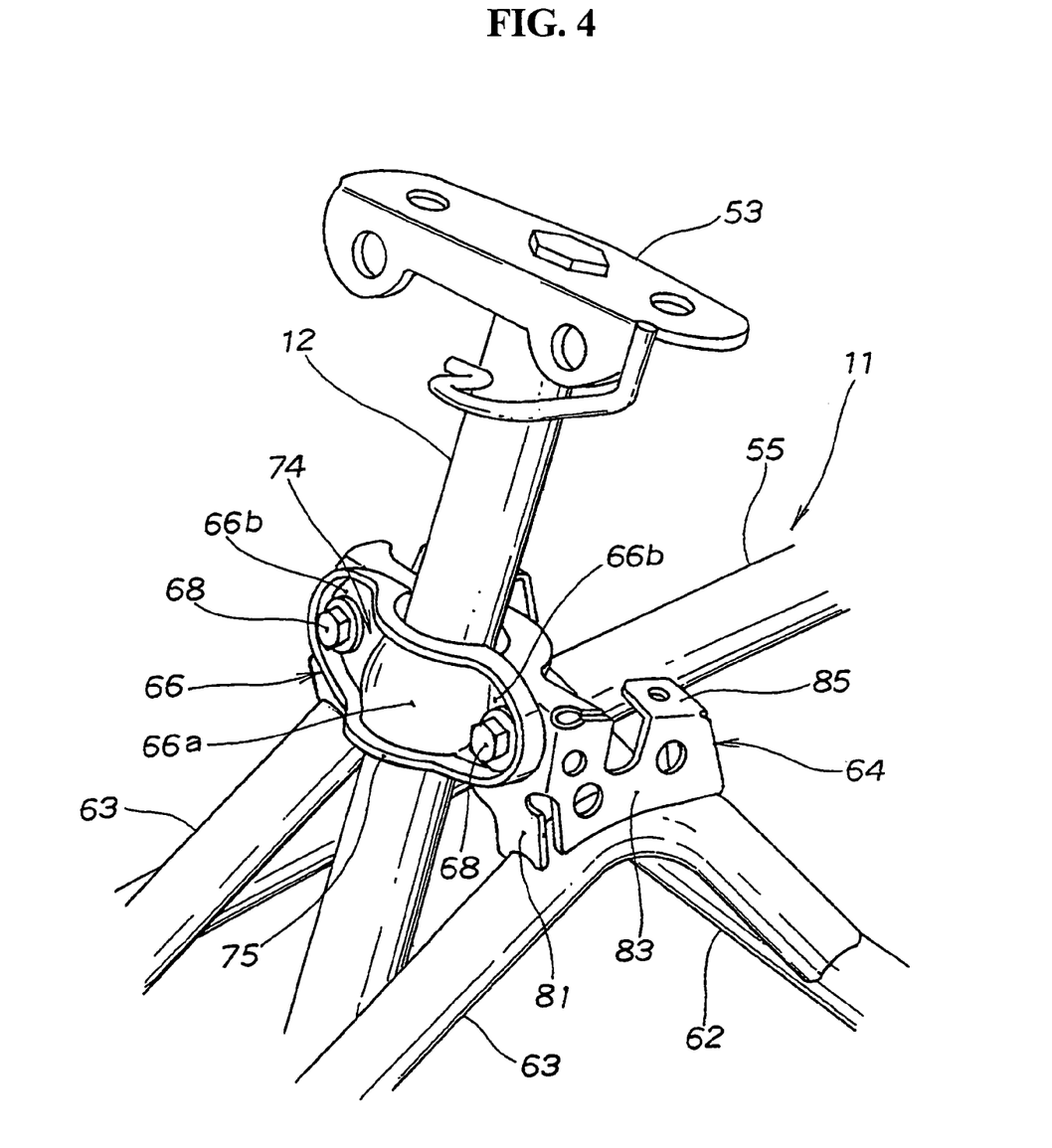
FIG. 4 is a first perspective view showing the steering shaft support structure according to the present invention.

FIG. 4 is a first perspective view showing the steering shaft support structure according to the present invention, which illustrates the steering shaft 12 supported at the upper cross beam 64 and the front holder 66 via the bushing 67, see FIG. 3.

The upper cross beam 64 is a member obtained by bend molding a plate material into a substantially box-shaped configuration. The front holder 66 is a press molded member provided with an arc forming portion formed with an arcuate portion 66a at the center portion thereof and with flat portions 66b and 66b at the both end portions thereof, while having an upright portion 75 for enhanced rigidity formed around the entire circumference of the edge portion of the arc forming portion 74.

Figure 5:
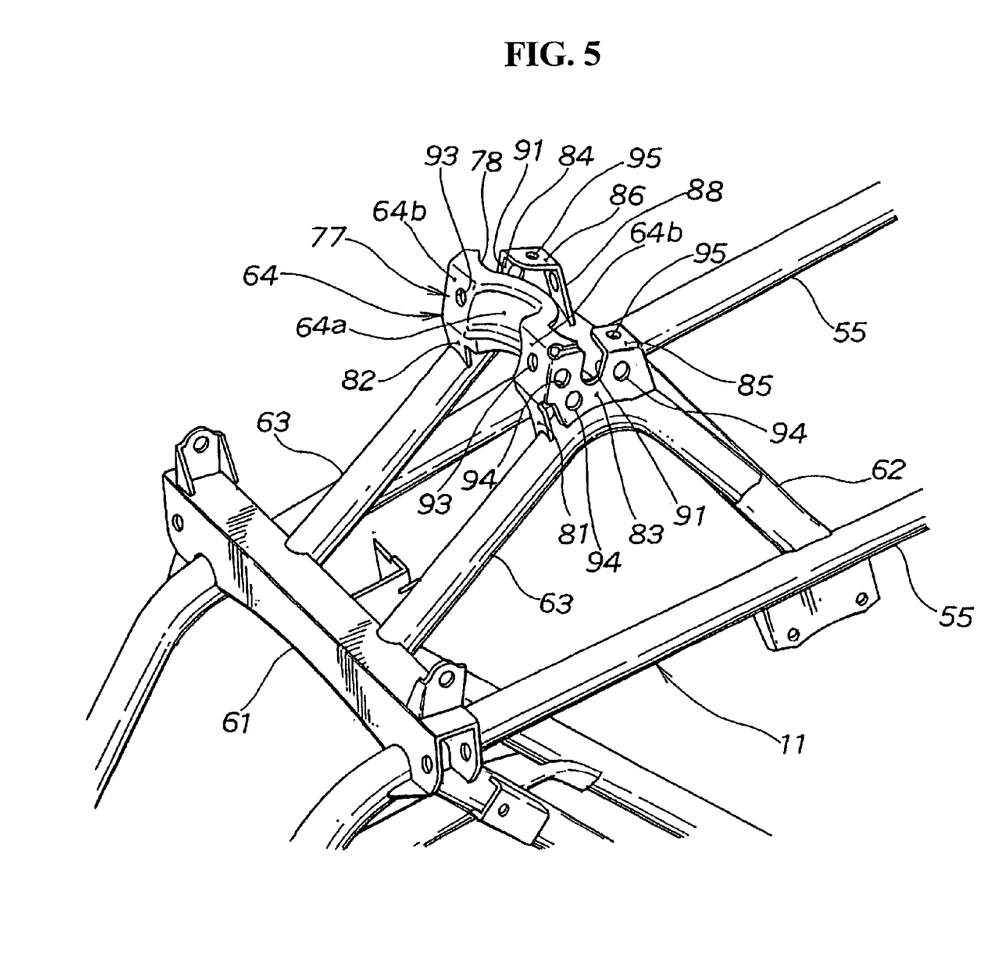
FIG. 5 is a second perspective view showing the steering shaft support structure according to the present invention.

FIG. 5 is a second perspective view showing the steering shaft support structure according to the present invention, which illustrates the state in which the steering shaft 12, see FIG. 4, and the front holder 66, see FIG. 4, have been removed.

The upper cross beam 64 is composed of an arc forming portion 77 formed with an arcuate portion 64a at the center thereof and with flat portions 64b and 64b at both end portions thereof. A protruding wall 78*is* formed to protrude rearwardly from the upper edge portion of the arcuate portion 77. Left and right front mount portions 81 and 82 are formed at the lower portion of the arc forming portion 77 for the mounting of the upper cross beam 64 on the front upper pipes 63. Side mount portions 83 and 84 are bent rearwardly from the respective left and right end portions of the arc forming portion 77 and mounted on the front upper pipes 63. Rear horizontal portions 85 and 86 are formed by inwardly and horizontally bending the respective upper portions of the side mount portions 83 and 84, see FIG. 3 for the reference numeral 87, formed by downwardly bending the respective rear portions of the rear horizontal portions 85 and 86 and mounted then on the front upper pipes 63. U-shaped notched portions 91 and 91 are provided in the side mount portions 83 and 84.

The arc forming portion 77 has bolt holes 93 and 93 for allowing the passage of the bolts 68 and 68, see FIG. 4, therethrough.

The side mount portions 83 and 84 have a plurality of through holes 94 for weight reduction.

The rear horizontal portions 85 and 85 have bolt holes 95 and 95. By using the bolt holes 95 and 95, the front portion of the fuel tank 34, see FIG. 1, is mounted.

Since the upper cross beam 64 is thus bent into an arcuate configuration at the arc forming portion 77 and are formed with the projecting wall 78, the rigidity thereof can be enhanced and the left and right front upper pipes 63 and 63 can be coupled firmly to each other so that the rigidity of the body frame 11 is also enhanced.

Since the upper cross beam 64 is mounted on the front upper pipes 63 and 63 at the front mount portions 81 and 82, at the side mount portions 83 and 84, and at the rear mount portions 87 and 88, it can be mounted firmly onto the front upper pipes 63 and 63. This allows the upper cross beam 64 to satisfactorily support the steering shaft 12, see FIG. 4, and the fuel tank 34, see FIG. 1.

Since the upper cross beam 64 serves as a support member for the steering shaft 12 and also as a support member for the fuel tank 34, the number of components can be reduced compared with the case where respective support members are provided distinctly for the steering shaft 12 and the fuel tank 34 so that the weight of the body 10 and the cost are reduced.

As described above with reference to FIGS. 1 and 4, the present invention is directed to a vehicle for uneven ground operation in which the front wheels 13 and 14 and the rear wheels 21 and 22 are suspended from the body frame 11 via a suspension and the front wheels 13 and 14 can be steered with the handle 15 via the steering shaft 12 mounted rotatably on the body frame 11. The upper cross beam 64 is placed in spanning relation between the left and right front upper pipes 63 and 63 composing the body frame 11 and the steering shaft 12 is supported by the upper cross beam 64.

Since the upper cross beam 64 is placed in spanning relation between the left and right front upper pipes 63 and 63 of the body frame 11 to support the steering shaft 12, the left and right front upper pipes 63 and 63 can be coupled firmly to each other with the upper cross beam 64 so that the rigidity of the body frame 11 is enhanced. In addition, the number of components can be reduced compared with the case where a steering shaft support member is provided so that a reduction in the weight of the body 10 is achievable.

By bend molding the upper cross beam 64 with the arcuate portion 64a and the protruding wall 78 to mount the steering shaft 12 on the upper cross beam 64, the rigidity of the upper cross beam 64 can be enhanced and the rigidity of the body frame 11 can further be enhanced compared with the case of enhancing the rigidity of the frame 11 by adding an extra member to the body frame 11, while an increase in weight is suppressed.

Since the upper cross beam 64 is manufactured by press molding and bend molding, the manufacturing thereof is easier than the case where the upper cross beam 64 is formed into a box-shaped configuration through bonding performed by welding or the like so that flexibility in designing the configuration is increased.

The present invention includes the upper cross beam 64 that comprises the rear horizontal portions 85 and 86 for supporting the fuel tank 34.

Since the upper cross beam 64 comprises the rear horizontal portions 85 and 86 for supporting the fuel tank 34, an extra fuel tank support member is no longer necessary. This achieves further reductions in the number of components and in the weight of the vehicle 10 for uneven ground operation.

The present invention achieves the following effects with the foregoing structures.

In the steering shaft support structure for a vehicle for uneven ground operation, the cross beam is placed in a spanning relationship between the left and right pipes composing the body frame to support the steering shaft. This allows the left and right pipes to be coupled firmly to each other with the cross beam and enhances the rigidity of the body frame. In addition, the number of components can be reduced compared with the case where a steering shaft support member is provided distinctly so that a reduction in the weight of the body is achievable.

By bend molding the cross beam to mount the steering shaft on the cross beam, the rigidity of the cross beam can be enhanced and the rigidity of the body frame can further be enhanced, while a weight increase is suppressed.

In the steering shaft support structure for a vehicle for uneven ground operation, the cross beam also comprises the tank supporting portion for supporting the fuel tank, an extra fuel tank support member is no longer necessary. This achieves further reductions in the number of components and in the weight of the body.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A steering shaft support structure for a vehicle for uneven ground operation in which front wheels and rear wheels are suspended from a body frame via a suspension and the front wheels can be steered with a handle via a steering shaft mounted rotatably on said body frame, said steering shaft support structure comprising:
   left and right pipes composing said body frame, each being formed in an L-shape, and each being provided with an arcuate portion at an upper-most portion thereof,
   a cross beam being placed in spanning relation between the upper-most portions of the left and right pipes, the cross beam having a first arcuate portion formed on a center portion thereof;
   a front holder having a second arcuate portion formed on a center portion thereof; and
   said first and second arcuate portions interlockingly support the steering shaft on the body frame in a rotatable manner,
   the cross beam including:
   an arc forming portion formed with the first arcuate portion at the center portion thereof and flat portions at both ends thereof with a protruding wall formed to protrude rearwardly from the upper edge of the first arcuate portion,
   left and right front mount portions formed, respectively, at lower portions of the flat portions for mounting the cross beam on the respective left and right pipes composing the body frame, and
   side mount portions bent rearwardly from outer lateral edges of the flat portions and mounted on the body frame.

2. The steering shaft support structure for a vehicle for uneven ground operation according to claim 1, wherein said cross beam comprises a tank support portion for supporting a fuel tank.

3. The steering shaft support structure for a vehicle for uneven ground operation according to claim 1, and further including a bushing mounted on said cross beam for rotatably mounting the steering shaft relative to the cross beam.

4. The steering shaft support structure for a vehicle for uneven ground operation according to claim 1, wherein the side mount portions include a plurality of apertures for reducing the weight of the cross beam.

5. The steering shaft support structure for a vehicle for uneven ground operation according to claim 1, wherein front and rear ends of the left and right L-shaped pipes extend downward from the upper-most portions of the pipes, the front and rear ends being attached, respectively, to first and second front cross members which bridge between a pair of main frames.

6. A steering shaft support structure for a vehicle for uneven ground operation in which front wheels and rear wheels are suspended from a body frame via a suspension and the front wheels can be steered with a handle via a steering shaft mounted rotatably on said body frame, said steering shaft support structure comprising:
 a cross beam being placed in spanning relation between left and right pipes composing said body frame, the cross beam having a first arcuate portion formed on a center portion thereof;
 a front holder having a second arcuate portion formed on a center portion thereof; and
 said first and second arcuate portions interlockingly support the steering shaft on the body frame in a rotatable manner, wherein said cross beam is formed by bend molding a plate material into a configuration that includes a pair of flat portions, side mount portions extending rearwardly from outer lateral edges of the flat portions, and rear mount portions extending inwardly from the side mount portions.

7. The steering shaft support structure for a vehicle for uneven ground operation according to claim 6, wherein the front holder is formed by press molding and being provided with an arc forming portion formed with the second arcuate portion at the center portion thereof.

8. The steering shaft support structure for a vehicle for uneven ground operation according to claim 7, the front holder further including flat portions extending from both ends thereof and a protruding peripheral portion extending forwardwardly for enhancing the rigidity of the front holder.

9. A steering shaft support structure for a vehicle wherein front wheels can be steered with a handle via a steering shaft mounted rotatably on said body frame, said steering shaft support structure comprising:
 a left support and a right support forming a body frame;
 a cross beam being placed in spanning relation between the left and right supports, the cross beam having a first arcuate portion formed on a center portion thereof;
 a front holder having a second arcuate portion formed on a center portion thereof; and
 said first and second arcuate portions interlockingly support the steering shaft on the body frame in a rotatable manner,
 wherein each of the left and right supports is formed with an upward arching bent portion, the cross beam being mounted on the upward arching bent portions of the left and right supports,
 wherein said cross beam is formed by bend molding a plate material into a configuration that includes a pair of flat portions, side mount portions extending rearwardly from outer lateral edges of the flat portions, and rear mount portions extending inwardly from the side mount portions.

10. The steering shaft support structure for a vehicle for uneven ground operation according to claim 9, wherein said cross beam comprises a tank support portion for supporting a fuel tank.

11. The steering shaft support structure for a vehicle for uneven ground operation according to claim 9, and further including a bushing mounted on said cross beam for rotatably mounting the steering shaft relative to the cross beam.

12. The steering shaft support structure for a vehicle for uneven ground operation according to claim 9, wherein the front holder is formed by press molding and being provided with an arc forming portion formed with the second arcuate portion at the center portion thereof.

13. The steering shaft support structure for a vehicle for uneven ground operation according to claim 12, the front holder further including the flat portions extending from both ends thereof and protruding peripheral portion extending forwardwardly for enhancing the rigidity of the front holder.

14. The steering shaft support structure for a vehicle for uneven ground operation according to claim 9, wherein the cross beam includes an arc forming portion formed with the first arcuate portion at the center portion thereof and the flat portions at both ends thereof with a protruding wall formed to protrude rearwardly from the upper edge of the first arcuate portion.

15. The steering shaft support structure for a vehicle for uneven ground operation according to claim 14, the cross beam further including left and right front mount portions formed, respectively, at lower portions of the flat portions for mounting the cross beam on the respective left and right supports composing the body frame.

16. The steering shaft support structure for a vehicle for uneven ground operation according to claim 15, the cross beam further including side mount portions bent rearwardly from the respective outer lateral edges of the flat portions and mounted on the body frame.

17. The steering shaft support structure for a vehicle for uneven ground operation according to claim 16, wherein the side mount portions include a plurality of apertures for reducing the weight of the cross beam.

18. The steering shaft support structure for a vehicle for uneven ground operation according to claim 9, wherein the left and right pipes are L-shaped.

19. The steering shaft support structure for a vehicle for uneven ground operation according to claim 9, wherein front and rear ends of the left and right pipes extend downward from the upward arching bent portions of the pipes, the front and rear ends being attached, respectively, to first and second front cross members which bridge between a pair of main frames.

* * * * *